US 9,059,867 B2

(12) United States Patent
Vasseur et al.

(10) Patent No.: US 9,059,867 B2
(45) Date of Patent: Jun. 16, 2015

(54) TECHNIQUE FOR SELECTING A PATH COMPUTATION ELEMENT BASED ON RESPONSE TIME DELAY

(75) Inventors: Jean-Philippe Vasseur, Dunstable, MA (US); David R. Oran, Acton, MA (US)

(73) Assignee: Cisco Technology, Inc., San Jose, CA (US)

( * ) Notice: Subject to any disclaimer, the term of this patent is extended or adjusted under 35 U.S.C. 154(b) by 2571 days.

(21) Appl. No.: 11/130,058

(22) Filed: May 16, 2005

(65) Prior Publication Data
US 2006/0198308 A1 Sep. 7, 2006

Related U.S. Application Data

(60) Provisional application No. 60/658,003, filed on Mar. 2, 2005.

(51) Int. Cl.
*H04L 12/46* (2006.01)
*H04L 12/801* (2013.01)
*H04L 29/08* (2006.01)

(52) U.S. Cl.
CPC ............ *H04L 12/4633* (2013.01); *H04L 47/10* (2013.01); *H04L 67/16* (2013.01); *H04L 67/104* (2013.01); *H04L 67/1068* (2013.01)

(58) Field of Classification Search
CPC ......... H04L 47/00; H04L 47/10; H04L 47/11; H04L 47/12; H04L 47/20; H04L 67/16; H04L 67/1068; H04L 67/104; H04L 45/00; H04L 45/02; H04L 45/26; H04L 45/12

USPC ......... 370/237, 238, 218, 229, 230, 231, 235, 370/351, 400, 252, 389; 709/238
See application file for complete search history.

(56) References Cited

U.S. PATENT DOCUMENTS

| 4,763,321 | A | * | 8/1988 | Calvignac et al. ............ 370/236 |
| 5,999,741 | A | * | 12/1999 | May et al. ...................... 717/173 |
| 6,021,113 | A | * | 2/2000 | Doshi et al. ................... 370/228 |
| 6,178,160 | B1 | | 1/2001 | Bolton et al. |
| 6,317,775 | B1 | | 11/2001 | Coile et al. |
| 6,542,468 | B1 | * | 4/2003 | Hatakeyama ................. 370/238 |
| 6,584,110 | B1 | * | 6/2003 | Mizuta et al. ................. 370/401 |
| 6,850,982 | B1 | | 2/2005 | Siegel |
| 7,151,939 | B2 | * | 12/2006 | Sheynblat ................... 455/456.1 |
| 7,225,266 | B2 | * | 5/2007 | Ameigeiras et al. .......... 709/235 |
| 2003/0061353 | A1 | | 3/2003 | Johnson et al. |
| 2005/0102405 | A1 | | 5/2005 | Siegel |

OTHER PUBLICATIONS

U.S. Appl. No. 60/658,003, filed Mar. 2, 2005, Vasseur et al.

(Continued)

*Primary Examiner* — Anh Ngoc Nguyen
(74) *Attorney, Agent, or Firm* — Novak Druce Connolly Bove + Quigg LLP

(57) ABSTRACT

A technique efficiently selects a path computation element (PCE) to compute a path between nodes of a computer network. The PCE selection technique is illustratively based on dynamic advertisements of the PCE's available path computation resources, namely a predictive response time (PRT). To that end, the novel technique enables one or more PCEs to dynamically send (advertise) their available path computation resources to one or more path computation clients (PCCs). In addition, the technique enables the PCC to efficiently select a PCE (or set of PCEs) to service a path computation request based upon those available resources.

21 Claims, 10 Drawing Sheets

(56) References Cited

OTHER PUBLICATIONS

U.S. Appl. No. 10/983,327, filed Nov. 5, 2004, Vasseur et al.
U.S. Appl. No. 10/767,574, filed Sep. 18, 2003, Vasseur et al.
Vasseur, J.P., et al., OSPF Working Group Internet Draft, entitled OSPF MPLS Traffic Engineering Capabilities (draft-vasseur-ospf-te-caps-00.txt), Jul. 2004, pp. 1-14.
Vasseur, J.P., et al., Internet Draft entitled, IS-IS MPLS Traffic Engineering Capabilities (draft-vasseur-isis-te-caps-00.txt), Jul. 2004, pp. 1-15.
Vasseur, J.P., et al., Network Working Group Internet Draft, entitled RSVP Path Computation Request and Reply Messages (draft-vasseur-mpls-computation-rsvp-05.txt), Jul. 2004, pp. 1-31.
Vasseur, J.P., et al., ISIS WG Internet Draft entitlted, IS-IS Extensions for Advertising Router Information (draft-ietf-isis-caps-01.txt), Apr. 2005, pp. 1-8.
Lindem, A., et al., Network Working Group Internet Draft, entitled Extensions to OSPF for Advertising Optional Router Capabilities (draft-ietf-ospf-cap-06.txt), Feb. 2005, pp. 1-14.
Smit, H., RFC 3784 entitled, Intermediate-System-to-Intermediate-System (IS-IS) Extensions for Traffic Engineering (TE), Jun. 2004, pp. 1-13.
Berger, L., RFC 3473 entitled, Generalized Multi-Protocol Label Switching (GMPLS) Signaling Resource ReserVation Protocol-Traffic Engineering (RSVP-TE) Extensions, Jan. 2003, pp. 1-40.
Rekhter, Y., RFC 1771, entitled A Border Gateway Protocol 4 (BGP-4), Mar. 1995, pp. 1-28.
Callon, R., RFC 1195, entitled Use of OSI ISIS for routing in TCP/IP and Dual Environments, Dec. 1990, pp. 1-80.
Braden, R. et al., RFC 2205, entitled Resource ReSerVation Protocol (RSVP), Version 1 Functional Specification, Sep. 1997, pp. 1-112.
Katz, D. et al., RFC 3630, entitled Traffic Engineering (TE) Extensions to OSPF Version 2, Sep. 2003, pp. 1-14.
Mannie, E., RFC 3945, entitled Generalized Multi-Protocol Label Switching (GMPLS) Architecture, Oct. 2004, pp. 1-65.
Mannie, E., RFC 3946, entitled Generalized Multi-Protocol Label Switching (GMPLS) Extensions for Synchronous Optical Network (SONET) and Synchronous Digital Hierarchy (SDH) Control, Oct. 2004, pp. 1-25.
Awduche, D., RFC 3209, entilted RSVP-TE: Extensions to RSVP for LSP Tunnels, Dec. 2001, 1-43.
Moy, J., RFC 2328, entitled OSPF Version 2, Apr. 1998, pp. 1-183.

\* cited by examiner

TECHNIQUE FOR SELECTING A PATH COMPUTATION ELEMENT BASED ON RESPONSE TIME DELAY

RELATED APPLICATIONS

This application claims the benefit of U.S. Provisional Application Ser. No. 60/658,003, entitled TECHNIQUE FOR SELECTING A PATH COMPUTATION ELEMENT BASED ON RESPONSE TIME DELAY, filed by Vasseur et al. on Mar. 2, 2005, the contents of which are hereby incorporated in their entirety.

This application is also related to U.S. patent application Ser. No. 10/983,280, entitled TECHNIQUE FOR SELECTING A PATH COMPUTATION ELEMENT, filed by Vasseur et al. on Nov. 5, 2004, the contents of which are hereby incorporated in its entirety.

BACKGROUND OF THE INVENTION

1. Field of the Invention

The present invention relates to computer networks and more particularly to selecting path computation elements for computing paths through a computer network.

2. Background Information

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other.

Computer networks may be further interconnected by an intermediate node, such as a router, to extend the effective "size" of each network. Since management of a large system of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas." It may be desirable, however, to increase the number of nodes capable of exchanging data; in this case, interdomain routers executing interdomain routing protocols are used to interconnect nodes of the various ASes. It may also be desirable to interconnect various ASes that are operated under different administrative domains. As used herein, a router that connects different areas or ASes together is generally referred to as a border router. In the case of areas rather than ASes since the routers are under a common authority, a single router may in fact serve as an exit border router of one area and an entry border router of another area.

An example of an interdomain routing protocol is the Border Gateway Protocol version 4 (BGP), which performs routing between ASes by exchanging routing and reachability information among neighboring interdomain routers of the systems. An adjacency is a relationship formed between selected neighboring (peer) routers for the purpose of exchanging routing information messages and abstracting the network topology. BGP generally operates over a reliable transport protocol, such as the Transmission Control Protocol (TCP), to establish a TCP connection/session. The BGP protocol is well known and generally described in Request for Comments (RFC) 1771, entitled *A Border Gateway Protocol 4 (BGP-4)*, published March 1995, which is hereby incorporated by reference.

Examples of an intradomain routing protocol, or an interior gateway protocol (IGP), are the Open Shortest Path First (OSPF) routing protocol and the Intermediate-System-to-Intermediate-System (ISIS) routing protocol. The OSPF and ISIS protocols are based on link-state technology and, therefore, are commonly referred to as link-state routing protocols. Link-state protocols define the manner with which routing information and network-topology information are exchanged and processed in an AS or area. This information is generally directed to an intradomain router's local state (e.g., the router's usable interfaces and reachable neighbors or adjacencies). In the case of ISIS, the local state is exchanged using link-state packets, whereas in the case of OSPF, the information is exchanged using link state advertisements (LSAs). The term "LSA" is used herein to generally reference both types of information exchange. The OSPF protocol is described in RFC 2328, entitled *OSPF Version 2*, dated April 1998 and the ISIS protocol is described in RFC 1195, entitled *Use of OSI ISIS for routing in TCP/IP and Dual Environments*, dated December 1990, both of which are hereby incorporated by reference.

Multi-Protocol Label Switching (MPLS) Traffic Engineering has been developed to meet data networking requirements such as guaranteed available bandwidth or fast restoration. MPLS Traffic Engineering exploits modern label switching techniques to build guaranteed bandwidth end-to-end tunnels through an IP/MPLS network of label switched routers (LSRs). These tunnels are a type of label switched path (LSP) and thus are generally referred to as MPLS Traffic Engineering (TE) LSPs. Examples of MPLS TE can be found in RFC 3209, entitled *RSVP-TE: Extensions to RSVP for LSP Tunnels*, dated December 2001, RFC 3784 entitled *Intermediate-System-to-Intermediate-System (IS-IS) Extensions for Traffic Engineering (TE)*, dated June 2004, and RFC 3630, entitled *Traffic Engineering (TE) Extensions to OSPF Version 2*, dated September 2003, the contents of all of which are hereby incorporated by reference in their entirety.

Establishment of an MPLS TE LSP from a head-end LSR to a tail-end LSR involves computation of a path through a network of LSRs. Optimally, the computed path is the "shortest" path, as measured in some metric, that satisfies all relevant LSP Traffic Engineering constraints such as e.g., required bandwidth, availability of backup bypass tunnels for each link and node included in the path, etc. Path computation can either be performed by the head-end LSR or by some other entity operating as a path computation element (PCE). The head-end LSR (or a PCE) exploits its knowledge of network topology and resources available on each link to perform the path computation according to the LSP Traffic Engineering constraints. Various path computation methodologies are available including CSPF (constrained shortest path first). MPLS TE LSPs can be configured within a single IGP area or may also span multiple IGP areas or ASes.

Some applications may incorporate unidirectional data flows configured to transfer time-sensitive traffic from a source (sender) in a computer network to a destination (receiver) in the network in accordance with a certain "quality of service" (QoS). Here, network resources may be reserved for the unidirectional flow to ensure that the QoS associated with the data flow is maintained. The Resource reSerVation Protocol (RSVP) is a network-control protocol that enables applications to reserve resources in order to obtain special QoS for their data flows. RSVP works in conjunction with routing protocols to, e.g., reserve resources for a data flow in a computer network in order to establish a level of QoS required by the data flow. RSVP is defined in R. Braden, et al., *Resource ReSerVation Protocol (RSVP)*, RFC 2205. In the case of traffic engineering applications, RSVP signaling is used to establish a TE-LSP and to convey various TE-LSP attributes to routers, such as border routers, along the TE-LSP obeying the set of required constraints whose path may have been computed by various means.

The PCE is an entity having the capability to compute paths between any nodes of which the PCE is aware in an AS or area. PCEs are especially useful in that they are more cognizant of network traffic and path selection within their AS or area, and thus may be used for more optimal path computation. A head-end LSR may further operate as a path computation client (PCC) configured to send a path computation request to the PCE, and receive a response with the computed path, potentially taking into consideration other requests from other PCCs. It is important to note that when one PCE sends a request to another PCE, it acts as a PCC. PCEs conventionally have limited or no visibility outside of its surrounding area or AS. A PCC can be informed of a PCE either by preconfiguration by an administrator, or by a PCE Discovery (PCED) message ("advertisement"), which is sent from the PCE within its area or across the entire AS to advertise its services.

One difficulty that arises in crossing AS boundaries is that path computation at the head-end LSR requires knowledge of network topology and resources across the entire network between the head-end and the tail-end LSRs. Yet service providers typically do not share this information with each other across AS borders. Neither the head-end LSR nor any single PCE will have sufficient knowledge to compute a path. Because of this, MPLS Traffic Engineering path computation techniques are required to compute inter-domain TE LSPs. A similar problem arises in computing the paths of MPLS Traffic Engineering LSPs across areas. Network topology and resource information do not generally flow across area boundaries even though a single service provider may operate all the areas.

The use of PCEs has been adapted to create a distributed PCE architecture, in order to extend MPLS TE LSPs across AS or area boundaries. An example of such a distributed architecture is described in commonly-owned copending U.S. patent application Ser. No. 10/767,574, entitled COMPUTING INTER-AUTONOMOUS SYSTEM MPLS TRAFFIC ENGINEERING LSP PATHS, filed by Vasseur et al., on Sep. 18, 2003, the contents of which are hereby incorporated by reference in its entirety. In a distributed PCE architecture, the visibility needed to compute paths is extended between adjacent areas and ASes so that PCEs may cooperate to compute paths across multiple areas or ASes by exchanging virtual shortest path trees (VSPTs) while preserving confidentiality across ASes. VSPTs, which may be represented as virtual links made of "loose hops," are used because service providers may desire to maintain their internal network architectures and designs confidential. One way to compute the VSPTs is by using a virtual shortest path tree (VSPT) algorithm. Generally, a VSPT is a compressed path description (entry and exit/destination points of areas/ASes) that informs a previous PCE that a destination can be reached from a particular entry to a particular exit in such a way that the internal path specifics are kept confidential from an adjacent area or AS. The virtual links that compose the VSPT will generally have an associated network cost for each calculated link. It should be noted that in the context of multiple ASes operating under a common authority (e.g. a unique service provider), such virtual links may also specify an entire path. A set of virtual links may be further organized (in certain protocols) within an explicit route object (ERO) to facilitate transfer of the compressed path descriptions to the previous PCE.

In some areas or ASes, it may be desirable to use multiple PCEs within the same adjacent area or AS to alleviate the load on any one PCE in particular and to avoid any single point of failure. In this case, a PCC may receive notification through multiple PCED advertisements that more than one PCE exists. Consequently, a PCC requesting the computation of a path, e.g., an MPLS inter-domain Traffic Engineering LSP, by means of the VSPT algorithm, for example, must first determine to which PCE it can send its path computation request. In addition to informing PCCs that it can act as a PCE for either inter-area and/or inter-AS Traffic Engineering path computation, a PCE can also inform the PCCs of its path computation capabilities, generally through the use of Type/Length/Value (TLV) encoding formats. Examples of TLV encoding formats used to specify MPLS Traffic Engineering capabilities are described in *OSPF MPLS Traffic Engineering Capabilities (draft-vasseur-ospf-te-caps.txt)* published July 2004, and *IS-IS MPLS Traffic Engineering Capabilities (draft-vasseur-isis-te-caps.txt)* published July 2004, both by Vasseur et al., both of which are expressly incorporated by reference in their entirety. These computation capabilities include, but are not limited to, the ability to compute local paths, inter-area paths, multi-domain paths, etc.

When there are multiple PCE "candidates," however, a PCC does not have sufficient information to adequately select a PCE based on its actual available path computation resources. This may lead to highly sub-optimal choices since a path computation request may be directed to an overloaded PCE which would result in increasing the path computation time (and consequently the path set up time). This is particularly true in environments where a large amount of requests are sent so as to reroute or re-optimize many paths, for instance, after a network element failure or restoration. There is a need, therefore, for an efficient technique to load balance interaction between PCEs and PCCs. There is also a need for a system and method to advertise a PCE's available path computation resources, and for a system and method for a PCC to additionally select the optimal PCE based upon those resources.

SUMMARY OF THE INVENTION

The present invention is directed to a technique for efficiently selecting a path computation element (PCE) to compute a path between nodes of a computer network. The PCE selection technique is illustratively based on dynamic advertisements of the PCE's available path computation resources, namely a predictive response time (PRT). To that end, the novel technique enables one or more PCEs to dynamically send (advertise) their available path computation resources to one or more path computation clients (PCCs). In addition, the technique enables the PCC to efficiently select a PCE (or set of PCEs) to service a path computation request based upon those available resources.

In accordance with one aspect of the present invention, a PCE continuously calculates a PRT as requests are received and may send notifications of the PRT to one or more PCCs. A PRT maximum (PRT_max) threshold value may be locally configured at the PCE, such that in the event the PRT exceeds PRT_max, the PCE notifies one or more PCCs of the congested state. Also, while in a congested state, once a configurable lower threshold value (PRT_min) is reached, the PCE may send a notification to clear the congested state.

In the illustrative embodiment described herein, the notifications are transmitted using Interior Gateway Protocol (IGP) messages. The congested PCE may create an IGP message that is used to propagate ("advertise") its congested state to PCCs in its domain, e.g., its IGP area/level. The IGP message may also indicate other information about the congested state, such as the current PRT and/or PRT_max of the PCE. The IGP message is illustratively embodied as an Open Shortest Path First (OSPF) or Intermediate-System-to-Intermediate-System (IS-IS) advertisement message ("IGP Advertisement"), respectively. Notably, the IGP Advertisement includes a type/length/value (TLV) encoded format used to convey the congestion information.

In accordance with another aspect of the present invention, a PCC sends a path computation request to a preferred PCE, which may explicitly signal a maximum response time (MRT) for the request, or which may be of a type associated with a predefined MRT. Upon receiving the request, the preferred PCE calculates a PRT for that request, and in the event the PRT is greater than the MRT, the PCE may send a response to the PCC indicating the inability to comply with the MRT.

In the illustrative embodiment described herein, a request/response signaling exchange for use between PCEs and PCCs is embodied as extensions to Resource reSerVation Protocol (RSVP) TE signaling messages. Notably, the RSVP extensions are, in turn, embodied as new RSVP objects, flags, and/or TLV encoded formats contained within the RSVP objects. Specifically, new RSVP extensions may be used to communicate desired information about the requests/response, such as the current PRT of the PCE or the MRT of the particular request.

In accordance with still another aspect of the present invention, upon receiving from a preferred PCE either a notification indicating congestion or a response to a request indicating an inability to comply with an MRT, a PCC may advantageously redirect its requests to an available alternate PCE (e.g., a non-congested PCE). In the event no alternate PCEs are available, e.g., with no or less congestion, the PCC utilizes either the current preferred PCE, or an alternate PCE with the least congestion.

Advantageously, the novel technique efficiently selects an appropriate PCE to compute a path, such as a Traffic Engineering (TE) label switched path (LSP), between nodes of a network to thereby reduce a set-up time for the TE-LSP and allows for faster convergence. TE-LSP set-up times are generally critical to TE sensitive applications and, thus, reduction of those times is desirable. By selecting an appropriate PCE, or, in the case of multiple PCEs, efficiently load balancing a set of requests among the PCEs, PCE overload is obviated, thus reducing the TE-LSP set-up time for a computed path.

BRIEF DESCRIPTION OF THE DRAWINGS

The above and further advantages of the invention may be better understood by referring to the following description in conjunction with the accompanying drawings in which like reference numerals indicate identical or functionally similar elements, of which.

DETAILED DESCRIPTION OF AN ILLUSTRATIVE EMBODIMENT

Figure 1A:
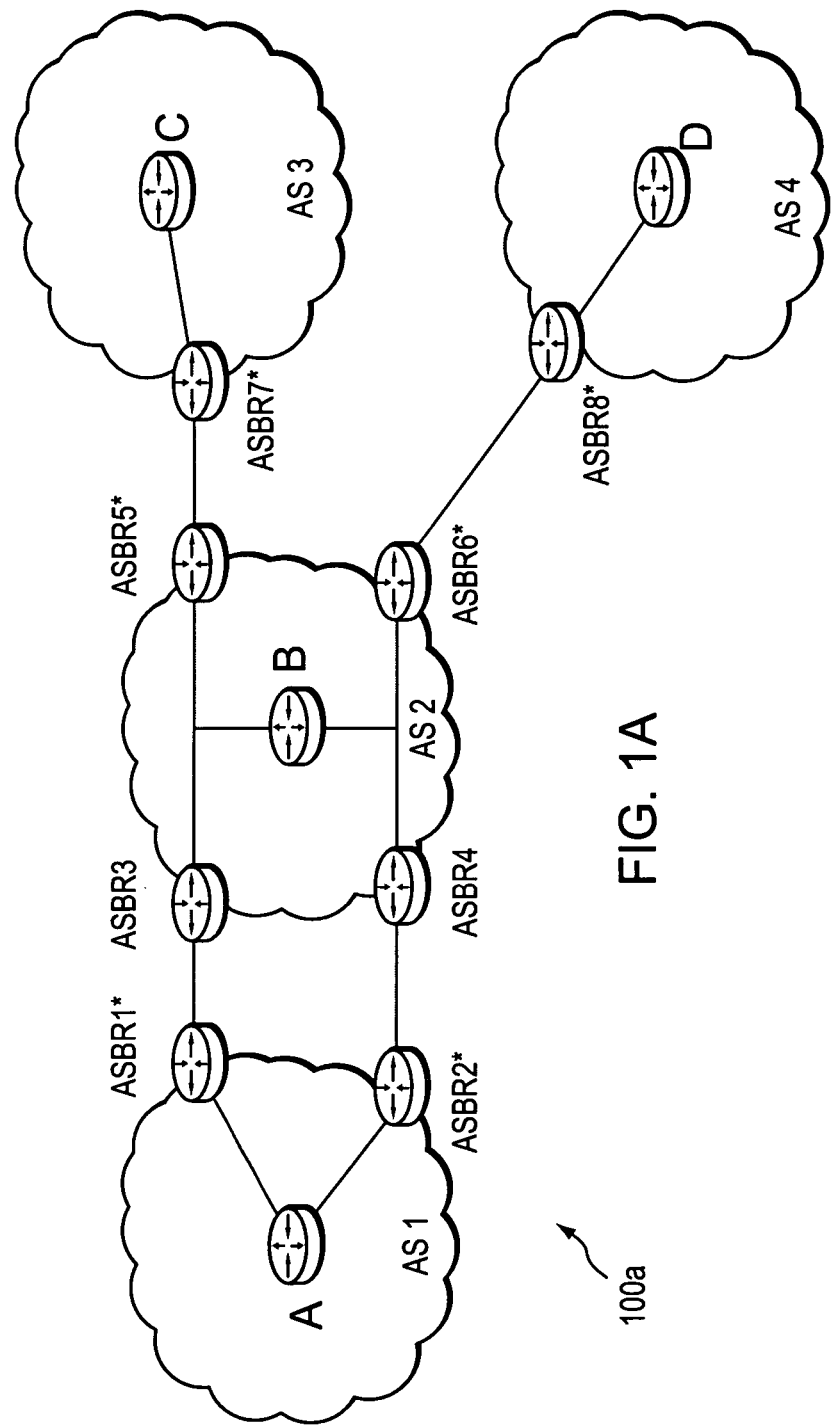
FIG. 1A is a schematic block diagram of an exemplary computer network of autonomous systems that may be used in accordance with the present invention.

FIG. 1A is a schematic block diagram of an exemplary computer network 100a comprising autonomous system AS2, which is interconnected with a plurality of other autonomous systems AS1, AS3, and AS4. An Autonomous System (AS) is herein defined to be a group of intermediate nodes, such as intradomain routers, within a network that are subject to a common authority and execute one or more intradomain routing protocols. Although, each AS is illustratively an autonomous system, those skilled in the art will appreciate that the ASes may alternatively be configured as routing domains or other networks or subnetworks. The autonomous system AS1 includes intradomain routers such as border routers ASBR1* and ASBR2* through which communication, such as data packets, may pass into and out of the autonomous system to border routers ASBR3 and ASBR4, respectively of AS2. AS2 also includes border routers ASBR5* and ASBR6* in communication with border routers ASBR7* and ASBR8* of ASes 3 and 4, respectively. Moreover, within AS1, AS2, AS3, and AS4, there are exemplary intradomain routers A, B, C, and D, respectively. Those skilled in the art will understand that any number of routers may be used in the ASes, and that the view shown herein is for simplicity.

Data packets may be exchanged among the autonomous systems AS1-AS4 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc. Routing information may be distributed among the routers within an AS using predetermined "interior" gateway protocols (IGPs), such as conventional distance-vector protocols or, illustratively, link-state protocols, through the use of link-state advertisements (LSAs) or link-state packets. In addition, data packets containing network routing information may be exchanged among the autonomous systems AS1-AS4 using "external" gateway protocols, such as the Border Gateway Protocol (BGP).

Figure 1B:
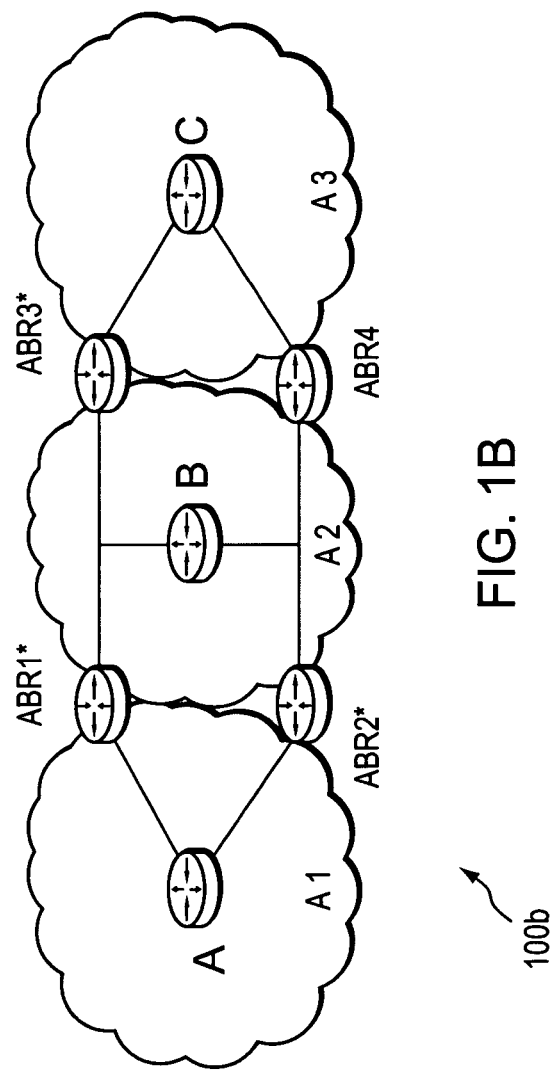
FIG. 1B is a schematic block diagram of an exemplary computer network of areas that may be used in accordance with the present invention.

FIG. 1B is a schematic block diagram of an exemplary computer network 100b comprising areas A1, A2, and A3, each having at least one intradomain router, A, B, and C, respectively. In addition, A1 and A2 share border routers ABR1* and ABR2*, while A2 and A3 share ABR3* and ABR4. As used herein, an area is a collection of routers that share full network topology information with each other but not necessarily with routers outside the area. The term area as used herein also encompasses the term "level" which has a similar meaning for networks that employ IS-IS as their IGP. These examples are merely representative. Furthermore, the techniques described below with reference to inter-AS path computation may be used in the context of inter-area path computation and, under certain conditions, the techniques described with reference to inter-area path computation may be used for inter-AS path computation. It will be understood by those skilled in the art that wherever autonomous systems are referred to, areas may be used also.

Figure 2:
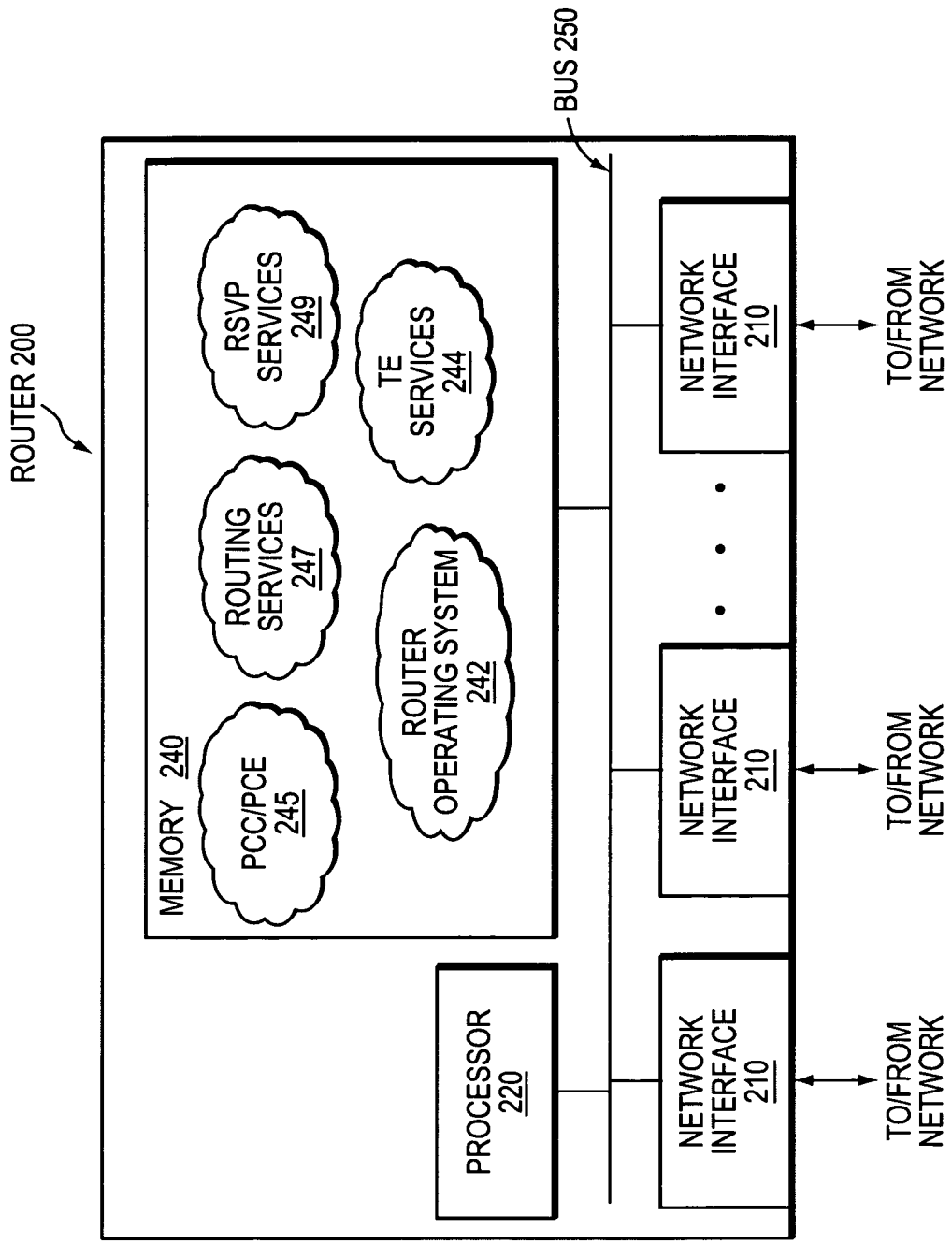
FIG. 2 is schematic block diagram of an exemplary router that may be advantageously used with the present invention.

FIG. 2 is a schematic block diagram of an exemplary router 200 that may be advantageously used with the present invention as an intradomain router or a border router. The router comprises a plurality of network interfaces 210, a processor 220, and a memory 240 interconnected by a system bus 250. The network interfaces 210 contain the mechanical, electrical and signaling circuitry for communicating data over physical links coupled to the network 100a,b. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc.

The memory 240 comprises a plurality of storage locations that are addressable by the processor 220 and the network interfaces 210. The processor 220 may comprise necessary elements or logic adapted to execute the software programs and manipulate the data structures. A router operating system 242, portions of which is typically resident in memory 240 and executed by the processor, functionally organizes the router by, inter alia, invoking network operations in support of software processes and/or services executing on the router. These software processes and/or services include routing services 247, Traffic Engineering (TE) services 244, PCE/PCC process 245, and RSVP services 249. It will be apparent to those skilled in the art that other processor and memory means, including various computer-readable media, may be used to store and execute program instructions pertaining to the inventive technique described herein.

Routing services 247 contain computer executable instructions executed by processor 220 to perform functions provided by one or more routing protocols, such as IGP and BGP. These functions may be configured to manage a forwarding information database (not shown) containing, e.g., data used to make forwarding decisions. TE services 244 contain computer executable instructions for operating TE functions in accordance with the present invention. Examples of Traffic Engineering are described in RFC 3209, RFC 3784, and RFC 3630 as incorporated above, and in RFC 3473, entitled, *Generalized Multi-Protocol Label Switching (GMPLS) Signaling Resource ReSerVation Protocol-Traffic Engineering (RSVP-TE) Extensions* dated January 2003, which is hereby incorporated by reference in its entirety. RSVP services 249 contain computer executable instructions for implementing RSVP and processing RSVP messages in accordance with the present invention. RSVP is described in Request for Comments (RFC) 2205, entitled *Resource ReSerVation Protocol (RSVP)*, and in RFC 3209, entitled *RSVP-TE: Extensions to RSVP for LSP Tunnels*, both as incorporated above.

Changes in the network topology may be communicated among routers 200 using a link-state protocol, such as the conventional OSPF and IS-IS protocols. Suppose, for example, that a communication link fails or a cost value associated with a network node changes. Once the change in the network's state is detected by one of the routers, that router may flood an IGP Advertisement communicating the change to the other routers in the network. In this manner, each of the routers eventually "converges" to an identical view of the network topology.

Figure 3:
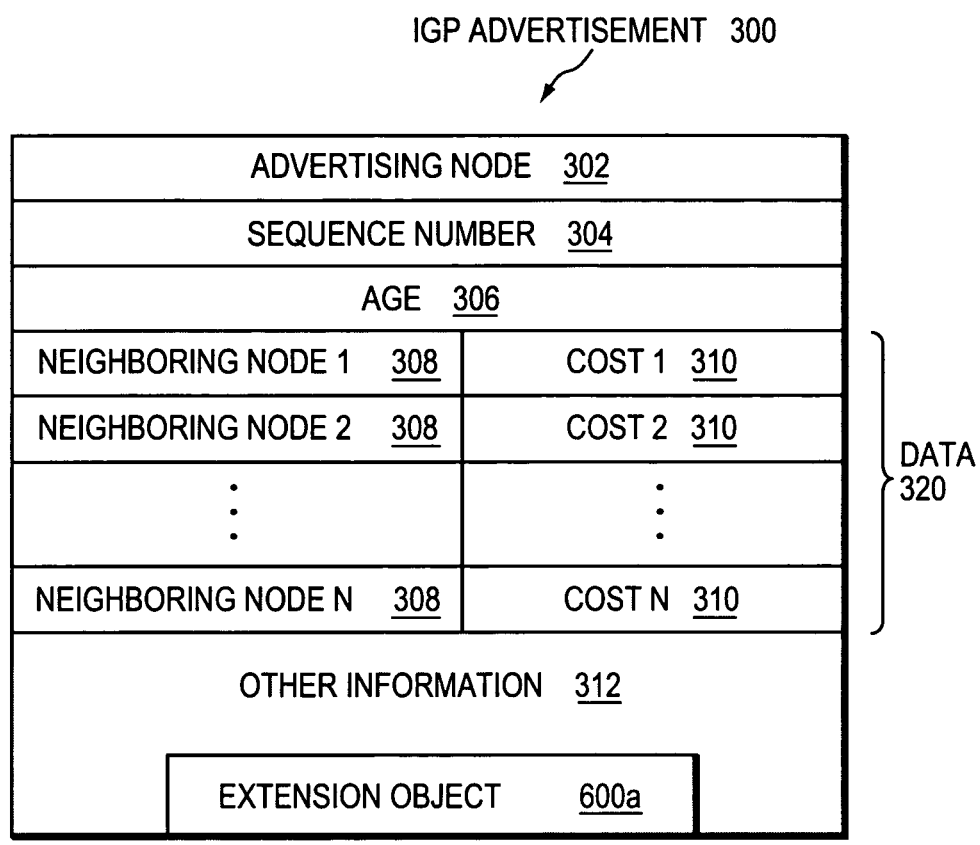
FIG. 3 is a schematic block diagram illustrating an encoding format that may be advantageously used with the present invention.

FIG. 3 illustrates an exemplary IGP Advertisement 300 that may be flooded by the routers 200. The packet includes an advertising-node field 302, a sequence-number field 304, an age field 306, a data section 320, and other routing information 312. The advertising-node field 302 stores a value that identifies the router that generated and originally broadcast the IGP Advertisement 300. The sequence-number field 304 stores a sequence number indicating the relative version of the IGP Advertisement. Typically, the sequence number stored in the field 304 is incremented, e.g., by one, for every new version of the IGP Advertisement. The IGP Advertisement 300 is therefore considered "stale" (invalid) if its sequence number is less than the sequence number stored in a previously-received version of the IGP Advertisement, i.e., generated by the same advertising node. Accordingly, the routers 200 may be configured to store and forward only the most recent version of an IGP Advertisement, e.g., the version having the largest sequence number.

The age field 306 also stores a value that may be used for determining whether the IGP Advertisement 300 is valid. The age value is typically initialized to a non-zero integer value, often in units of seconds. The age value may be decremented, e.g., by one every second, until the age value reaches zero, thereby indicating that the IGP Advertisement has become invalid. That is, every router 200 that stores or floods the IGP Advertisement 300 continuously ages the packet until the age value equals zero. Those skilled in the art will appreciate that other aging mechanisms alternatively may be used, such as incrementing the IGP Advertisement age value from an initial value, e.g., equal to zero, until the age value reaches a known upper limit.

The data section 320 may include one or more pairs of neighboring-node fields 308 and cost fields 310. Each neighboring-node field 308 stores a value, such as an address, indicating a network node that is directly accessible from the intermediate node stored in the advertising-node field 302. The field 310 stores a cost value that has been associated, e.g., by the advertising node, with the network node identified in the neighboring-node field 308. As shown, each neighboring-node field 308 is associated with only one corresponding cost field 310. However, it is noted that in other embodiments, a single neighboring node may be associated with a plurality of cost values. Other routing information 312 may also be included in the IGP Advertisement 300, such as checksum values, packet-length information, flag values, type-of-service metrics, etc., and/or an Extension Object 600a (described further below). Generally, the received IGP Advertisements are stored in a Link-State Database (LSDB) of the router 200 (not shown), or in some cases in a TE Database of the router 200 (not shown).

In one embodiment, the routers described herein are IP routers that implement Multi-Protocol Label Switching (MPLS) and operate as label switched routers (LSRs). In one simple MPLS scenario, at an ingress to a network, a label is assigned to each incoming packet based on its forwarding equivalence class before forwarding the packet to a next-hop router. At each router, a forwarding selection and a new substitute label are determined by using the label found in the incoming packet as a reference to a label forwarding table that includes this information. At the network egress (or one hop prior), a forwarding decision is made based on the incoming label but optionally no label is included when the packet is sent on to the next hop.

The paths taken by packets that traverse the network in this manner are referred to as label switched paths (LSPs). Establishment of a TE-LSP requires computation of a path, signaling along the path, and modification of forwarding tables along the path. MPLS TE establishes LSPs that have guaranteed bandwidth under certain conditions. Illustratively, the TE-LSPs may be signaled through the use of the RSVP protocol and, in particular, RSVP-TE signaling messages.

In accordance with RSVP-TE, to establish a data path for the TE-LSP between a sender (e.g., head-end node A) and a receiver (e.g., tail-end node B), the sender may send an RSVP path (Path) message (not shown) downstream hop-by-hop along a path (e.g., a unicast route) to the receiver to identify the sender and indicate e.g., bandwidth needed to accommodate the data flow, along with other attributes of the TE-LSP. The Path message may contain various information about the TE-LSP including, e.g., various characteristics of the TE-LSP. To establish a TE-LSP (data flow) between the receiver and the sender, the receiver may return an RSVP Reserve (Resv) message (not shown) upstream along the path to the sender to confirm the attributes of the TE-LSP, and provide a TELSP label. It should be noted that in accordance with RSVP signaling, the state of the RSVP is refreshed on a timed interval, e.g., every thirty seconds, in which RSVP Path and Resv messages are exchanged. This timed interval is configurable by a system administrator.

Although the illustrative embodiment described herein is directed to MPLS, it should be noted that the present invention may advantageously apply to Generalized MPLS (GMPLS), which pertains not only to packet and cell-based networks, but also to Time Division Multiplexed (TDM) and optical networks. GMPLS is well known and described in RFC 3945, entitled *Generalized Multi-Protocol Label Switching (GMPLS) Architecture*, dated October 2004, and RFC 3946, entitled *Generalized Multi-Protocol Label Switching (GMPLS) Extensions for Synchronous Optical Network (SONET) and Synchronous Digital Hierarchy (SDH) Control*, dated October 2004, the contents of both of which are hereby incorporated by reference in their entirety.

To compute paths across multiple areas or ASes, above-referenced U.S. application Ser. No. 10/767,574 describes the use of a virtual shortest path tree (VSPT) algorithm in a distributed path computation element (PCE) architecture, which has been incorporated by reference herein. According to the VSPT algorithm, for an inter-AS path computation example such as in FIG. 1A, a PCC (Router A) first sends a path computation request to a known local PCE in its AS, such as ASBR1*, to compute a path to a destination (e.g., a tail-end LSR) such as Router C in AS3. As an example, border routers marked with '*' in FIGS. 1A and 1B are PCE enabled border routers. The address of the local PCE may be manually configured. Alternatively, the PCE may advertise itself through flooding within the AS. Path computation element discovery (PCED) techniques can be used in accordance with OSPF *MPLS Traffic Engineering Capabilities* or *ISIS MPLS Traffic Engineering Capabilities* by Vasseur, et al., incorporated by reference above. A PCED message may include indications of PCE capabilities, such as the ability to compute local paths, inter-area paths, inter-AS paths, multi-domain paths, diverse paths, etc. In the illustrative embodiment, a PCED may be contained within a conventional IGP advertisement 300 (e.g., an OSPF LSA), generally through the use of an extension object 600a.

The path computation request (and response) may be made in accordance with a protocol specified in Vasseur, et al. *RSVP Path Computation Request and Reply Messages*, Internet Draft, July 2004, which is hereby incorporated by reference as though fully set forth herein. Knowledge of the PCE addresses may be acquired by way of static configuration or IGP/BGP advertisements, as could be readily devised by one of skill in the art. It should be understood that the use of RSVP serves only as an example, and that other communication protocols (e.g., other PCE-PCC communication protocols) may be used in accordance with the present invention.

Figure 4:
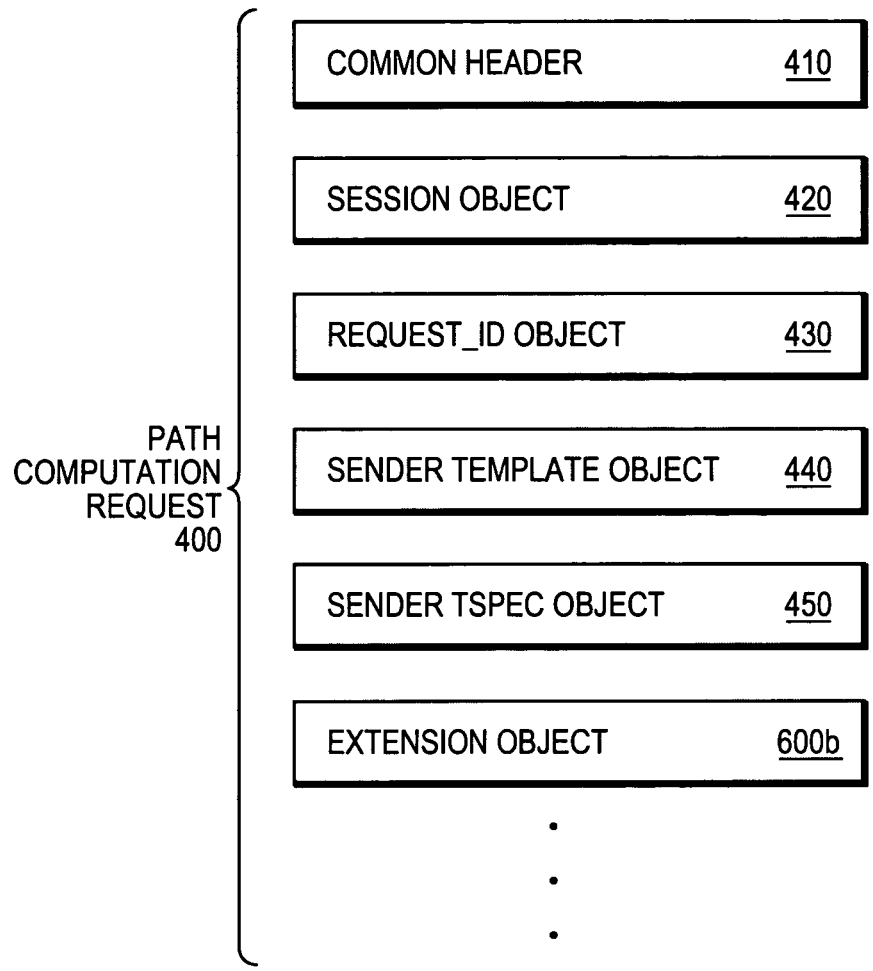
FIG. 4 is a schematic block diagram of portions of a Path Computation Request message that may be advantageously used with the present invention.

FIG. 4 is a schematic block diagram of portions of a Path Computation Request message 400 that may be advantageously used with the present invention. Illustratively, the Path Computation Request (request) is embodied as extensions to RSVP-TE signaling messages. Request 400 contains, inter alia, a common header 410, a session object 420, a request identification (request_ID) object 430, a sender template object 440, and a sender traffic specification (Tspec) object 450, as understood by those skilled in the art. It should be noted that request 400 may contain other objects including those for containing various path constraints (not shown) and/or a novel extension object 600b (described further below).

Figure 5:
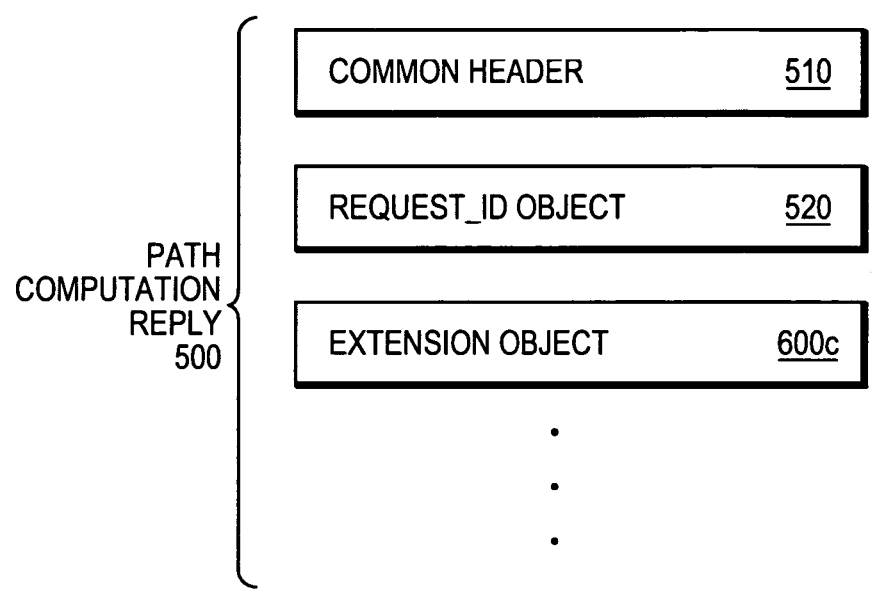
FIG. 5 is a schematic block diagram of portions of a Path Computation Reply message that may be advantageously used with the present invention.

FIG. 5 is a schematic block diagram of portions of a Path Computation Reply message 500 that may be advantageously used with the present invention. Illustratively, the Path Computation Reply (reply) is also embodied as extensions to RSVP-TE signaling messages. Reply 500 contains, inter alia, a common header 510 and a request_ID object 520. It should be noted that reply 500 may contain other objects including a novel extension object 600c (described further below).

There are several circumstances, such as inter-domain MPLS Traffic Engineering, where a PCC may have the choice among a set of PCEs to send one or more path computation requests. The number of PCEs may vary but typically it is a small number, such as, e.g., 5 or 6. Since load and capacity information of such PCEs may not be available (or may be advertised as static values), the PCC may arbitrarily choose a PCE, thus potentially resulting in over-loading a PCE whereas other PCEs may be more responsive. Moreover, events local to the PCE may occur thus limiting the PCE path computation resources. For example, the per-request service time for a PCE may vary widely and hence the delay for a request based on a simple count of current requests may not be an adequate indicator of load.

The present invention is directed to a technique for efficiently selecting a PCE to compute a path between nodes of a computer network. The PCE selection technique is illustratively based on dynamic advertisements of the PCE's available path computation resources, namely a predictive response time (PRT). To that end, the novel technique enables one or more PCEs to dynamically send (advertise) their available path computation resources to one or more PCCs. In addition, the technique enables the PCC to efficiently select a PCE (or set of PCEs) to service a path computation request based upon those available resources.

In accordance with one aspect of the present invention, a PCE continuously calculates a PRT as requests are received and may send notifications of the PRT to one or more PCCs. A PRT maximum (PRT_max) threshold value may be locally configured at the PCE, such that in the event the PRT exceeds PRT_max, the PCE notifies one or more PCCs of the congested state. Also, while in a congested state, once a configurable lower threshold value (PRT_min) is reached, the PCE may send a notification to clear the congested state. Notably, the use of upper and lower thresholds reduces undesirable oscillation that would occur if the congested state were cleared as soon as the PRT reaches a value less than PRT_max, as the PCE may receive many more requests once PCCs are notified of the cleared state. Notably, the PCE may also periodically send advertisements of its PRT (e.g., its current "load"), such that PCCs may choose a PCE with the least load prior to its becoming congested.

Various methods to calculate/estimate the PRT will be understood by those skilled in the art. For example, the PCE may use a Markov Chain to estimate the PRT, in which case the PRT is equal to "$(1/a)/(1-b)$," where "a" is the service rate of requests and "b" is equal to the arrival rate of requests divided by the service rate (a). Other known algorithms may be used to calculate the PRT in accordance with the present invention, such as, e.g., empiric algorithms using a low-pass filter based on computed/observed response time. Those skilled in the art will understand that the present invention is not limited by how the PRT is calculated.

In the illustrative embodiment described herein, the notifications are transmitted using IGP messages 300. The congested PCE may create an IGP message 300 that is used to propagate ("advertise") its congested state to PCCs in its domain, e.g., its IGP area/level. The IGP message 300 may also indicate other information about the congested state, such as the current PRT and/or PRT_max of the PCE. The IGP message is illustratively embodied as an Open Shortest Path First (OSPF) or Intermediate-System-to-Intermediate-System (IS-IS) advertisement message ("IGP Advertisement"), respectively. Notably, the IGP Advertisement includes a type/length/value (TLV) encoded format used to convey the congestion information, such as extension object 600a.

Figure 6:
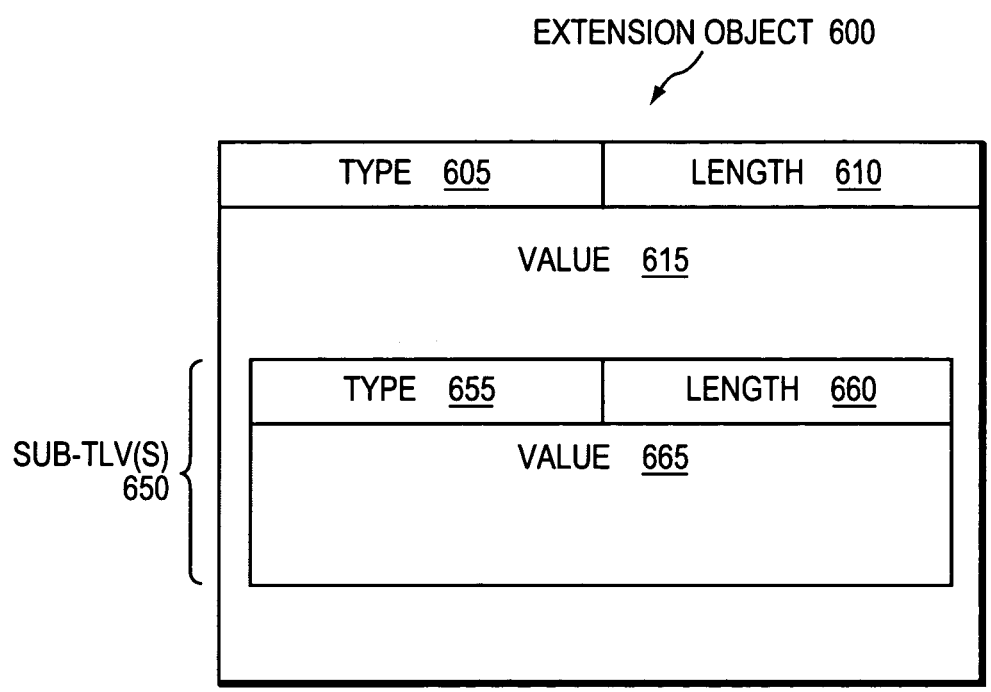
FIG. 6 is a schematic block diagram illustrating an Extension Object encoded using a TLV that may be advantageously used with the present invention.

FIG. 6 is a schematic block diagram illustrating an Extension Object 600a encoded using a TLV that may be advantageously used with the present invention. The TLV encoding format is a general way to communicate information between nodes, such as routers. The TLV "attribute" 600 is used to identify a type (T) of information being communicated (conveyed), a length (L) of information to be conveyed and a value (V) of the actual information conveyed. The length (L) parameter contained in the length field 610 is typically implementation-specific and can denote the length from the beginning of the Type field 605 of the attribute 600 to the end. However, the length generally denotes the length of the Value (V) field 615 and not the Type (T) or Length (L) fields. The TLV encoded format may also comprise one or more non-ordered sub-TLVs 650 carried within the TLV "payload" (e.g. Value field 615), each having a Type field 655, Length field 660, and Value field 665. Illustratively, the Extension Object 600a is embodied as a new TLV or sub-TLV type carried, e.g., within an IS-IS Router Capability TLV, which is further described in Vasseur, et al., *IS-IS Extensions for Advertising Router Information* <draft-ietf-isis-caps-01.txt>, Internet Draft, April 2005, or within an OSPF Router Information IGP message, which is further described in Lindem, et al., *Extensions to OSPF for Advertising Optional Router Capabilities* <draft-ietf-ospf-cap-06.txt>, Internet Draft, February 2005, the contents of both of which are hereby incorporated by reference in their entirety.

As an example, the extended object 600a may be used as mentioned above to carry the PCED within the IGP message 300 when advertising capabilities of a PCE. The PCED TLV comprises a set of non-ordered sub-TLVs 650 carried within the TLV "payload" (e.g. Value field 615), that define the PCE capabilities. A novel sub-TLV 650 is defined to carry the new PCE capability in accordance with the present invention. For instance, the novel sub-TLV 650 may be configured to contain the desired congestion information, such as, e.g., the current PRT of the PCE, the PRT_max of the PCE, and/or a difference between the PRT and PRT_max, either as individual sub-TLVs or as a plurality of fields within a single sub-TLV. Sub-TLV 650 may also contain other means to indicate congestion, such as flags (not shown) or predefined values indicating various levels of congestion. Notably, the indication of congestion does not need to be located within a PCED message, but may in fact be a separate type of IGP message. Moreover, the indication of congestion may be a value within the Value field 615, and not within a sub-TLV 650. Those skilled in the art will understand that other formats of the information are within the scope of the present invention, and that those formats shown herein for illustration are not meant to be limiting in any way.

Optionally, the notification may include a specified time for which the requesting PCCs must wait before the PCE is willing to receive further requests (e.g., a retry timer). Notably, to reduce the likelihood that the PCE will be inundated with requests at the expiration of the specified time, each PCC may be configured to jitter its requests after the expiration of the retry timer. Jitter techniques are generally known in the art, and include such methods as random delay timers, etc., in order to spread out the many possible requests pending the timer expiration.

In accordance with another aspect of the present invention, a PCC sends a path computation request to a preferred PCE, which may explicitly signal a maximum response time (MRT) for the request, or which may be of a type associated with a predefined MRT. Notably, request types include various types of prioritized TE-LSP requests, such as, e.g., initial establishment requests, reroute requests, re-optimization requests, etc. For example, an initial request may be configured with a shorter MRT (e.g., a higher priority) than a re-optimization request because the re-optimization request may generally be associated with a TE-LSP already established (e.g., thus a lower priority). Moreover, the request type may simply include all TE-LSP requests, such that a single MRT is generally defined for all types of requests. Upon receiving the request, the preferred PCE calculates a PRT for that request, and in the event the PRT is greater than the MRT, the PCE may send a response to the PCC indicating the inability to comply with the MRT. Also, the PCE may respond to the specific request with an indication of congestion if the PRT_max of the PCE is reached as described above.

In the illustrative embodiment described herein, a request/response signaling exchange for use between PCEs and PCCs is embodied as extensions to RSVP-TE signaling messages, as described above. Notably, the RSVP extensions are, in turn, embodied as new RSVP objects, flags, and/or TLV encoded formats contained within the RSVP objects. Specifically, new RSVP extensions may be used to communicate desired information about the requests/response, such as the current PRT of the PCE or the MRT of the particular request.

In particular, referring again to FIG. 6, an Extension Object 600b may be used to convey the MRT from a PCC within a path computation request message 400 of FIG. 4. As noted above, the Value field 615 and/or the sub-TLV(s) 650 may contain the MRT. Those skilled in the art will understand that other formats of the information are within the scope of the present invention, and that those formats shown herein for illustration are not meant to be limiting in any way.

Moreover, an Extension Object 600c may be used to convey the PRT of a PCE and/or inability to comply within a path computation reply message 500 of FIG. 5. For instance, the Extension Object 600c may be configured to contain the desired information, such as, e.g., an indication of the inability to comply with the MRT of the request, the current PRT of the PCE, the PRT_max of the PCE, and/or a difference between the PRT and PRT_max, either as individual objects, or as a plurality of fields within a single object. The Extension Object 600c may also contain other means to indicate congestion, such as flags (not shown) or predefined values indicating the inability to comply with the MRT of the request and/or various levels of congestion. Notably, the indication of the inability to comply may be a value within a sub-TLV 650, and not within a Value field 615. Those skilled in the art will understand that other formats of the information are within the scope of the present invention, and that those formats shown herein for illustration are not meant to be limiting in any way.

In accordance with still another aspect of the present invention, upon receiving from a preferred PCE either a notification indicating congestion or a response to a request indicating an inability to comply with an MRT, a PCC may advantageously redirect its requests to an available alternate PCE (e.g., a non-congested PCE). To redirect requests, the PCC resends its pending requests (or a set of pending requests) to the alternate PCE, and also sends a novel "clear_request" path computation message, similar to path computation message 400 described above. In the clear_request message, the extension object 600b may be utilized to signal the previously preferred PCE to clear any (or a set of) pending requests for that particular PCC. Notably, the previously preferred PCE may be configured to clear the request in response to a congested state regardless of a received clear_request message. In the event no alternate PCEs are available, e.g., with no or less congestion, the PCC utilizes either the current preferred PCE, or an alternate PCE with the least congestion. A PCC may also receive notifications of a current PRT or load of the PCEs prior to their becoming congested, and as such the PCC may select the PCE with the least load accordingly.

Once the congested state of a PCE is cleared, the PCC may decide to again send all further requests to the preferred PCE. Notably, in the event that all available PCEs are in a congested state, the PCC may decide to distribute its request(s) across such PCEs proportionally to the PCE load (if available) or by using other distribution techniques known in the art, such as, e.g., a round-robin algorithm.

In some network configurations, a PCE may be capable of dynamically determining the list of alternate PCEs serving the PCC. In this case, the notification of congestion (e.g., advertisement or reply) is triggered if and only if the preferred PCE determines that an alternate PCE exists that is not congested. For instance, the preferred PCE may also receive and monitor the load advertisements from other PCEs as described above.

Figure 7:
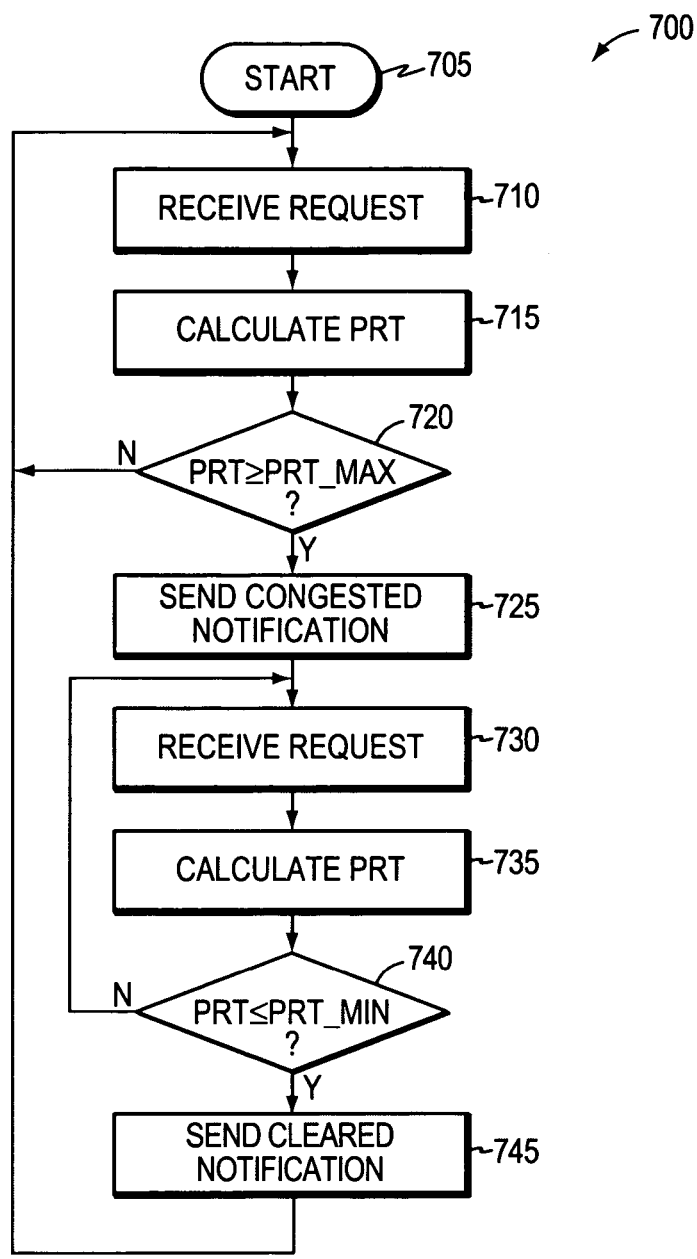
FIG. 7 is a flowchart illustrating a sequence of steps for identifying a congested PCE state in accordance with the present invention.

FIG. 7 is a flowchart illustrating a sequence of steps for identifying a congested PCE state in accordance with the present invention. Sequence 700 starts at step 705 and continues to step 710 where a PCE receives a path computation request from a PCC. At step 715, the PCE calculates/estimates a PRT, which is then compared to a locally configured PRT_max value in step 720. If the PRT is less than the PRT_max, the PCE processes the request and the sequence returns to step 710 to receive the next request. If the PRT is greater than or equal to the PRT_max, however, the PCE is congested, and in step 725 the PCE sends a notification of congestion, as described above.

Once in the congested state, the PCE may or may not receive more requests at step 730, depending on local PCC configuration during a congested state, as described herein. Regardless, the PCE calculates/estimates the PRT for the requests in step 735, e.g., either the current received request, or the last received request that triggered the congested state. (Notably, the PRT may also be re-evaluated in the absence of any new received path computation requests.) At step 740, the PRT is compared with a PRT_min value. If the PRT is greater than the PRT_min, the PCE is still considered congested (to prevent oscillation, as described herein), and the sequence returns to step 730 to possibly receive a next request. If the PRT is less than or equal to the PRT_min, however, the PCE is no longer congested, and in step 745 the PCE sends a notification to clear the congested state, as described above. The sequence 700 then continues from step 710 to receive the next request in a non-congested state at the PCE.

Figure 8:
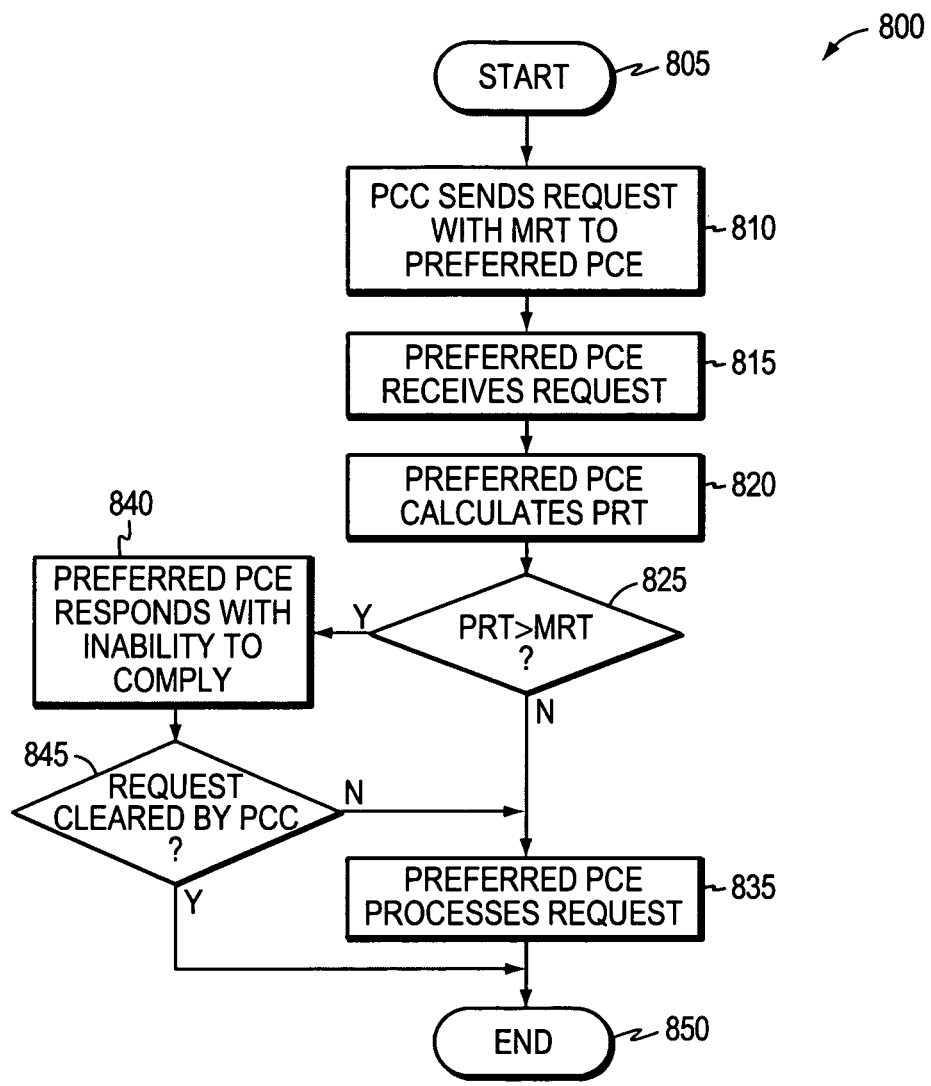
FIG. 8 is a flowchart illustrating a sequence of steps for responding to path computation requests in accordance with the present invention.

FIG. 8 is a flowchart illustrating a sequence of steps for responding to path computation requests in accordance with the present invention. Sequence 800 starts at step 805 and continues to step 810 where the PCC sends a request to the preferred PCE including an MRT. At step 820, the preferred PCE receives the request, and in step 825 the preferred PCE calculates/estimates the PRT for the request. If the PRT is less than the MRT, the PCE processes the request at step 835, and the sequence ends at step 855. If the PRT is greater than or equal to the MRT, however, the PCE is more congested than the requesting PCC desires, and in step 840 the preferred PCE responds to the request indicating an inability to comply with the MRT, as described above. If at step 845 the preferred PCE receives an indication that the PCC has cleared the request, the PCE clears the request in step 850, and the sequence ends at step 855 without processing the request. On the other hand, if the PCC does not clear the request (e.g., there is no alternate PCE), the preferred PCE processes the request in step 835, and the sequence ends at step 855. In some cases, the PCE may be configured to clear the request without a clear_request message, as described above.

Figure 9:
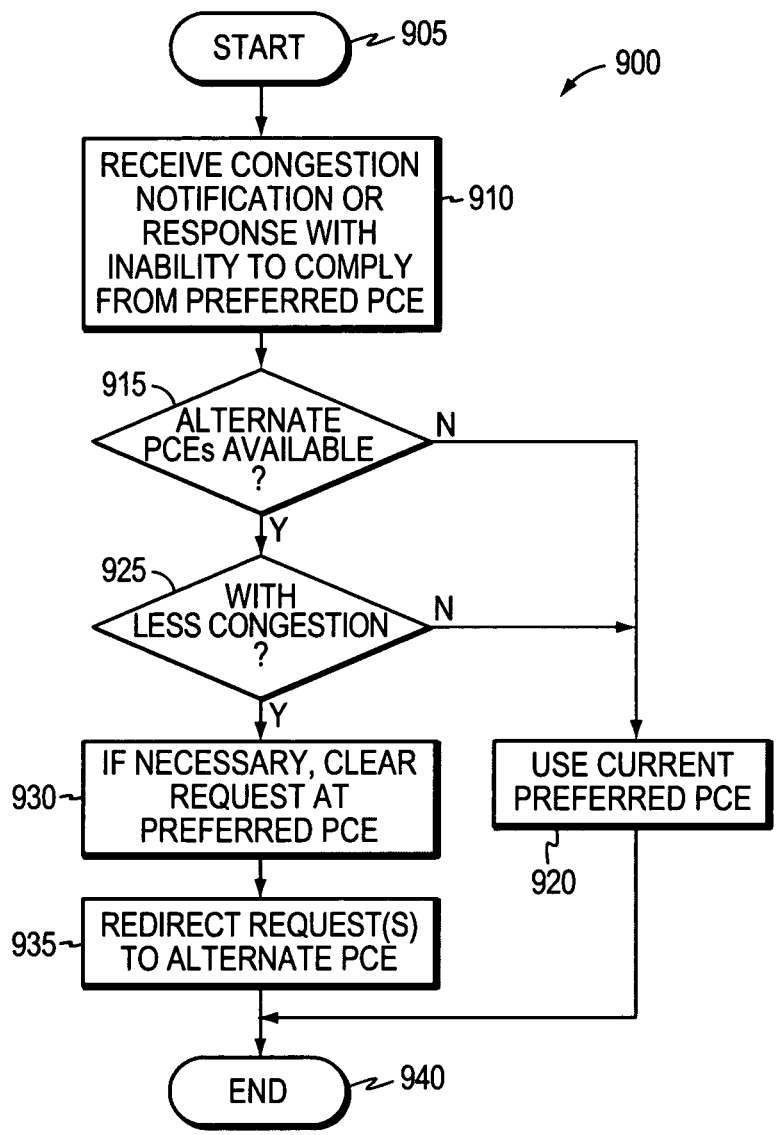
FIG. 9 is a flowchart illustrating a sequence of steps for selecting an appropriate PCE in accordance with the present invention.

FIG. 9 is a flowchart illustrating a sequence of steps for selecting an appropriate PCE in accordance with the present invention. Sequence 900 starts at step 905 and continues to step 910 where a PCC receives from a preferred PCE either a congestion notification, or a response to a path computation request indicating an inability to comply with an MRT of the request. If there are no alternate PCEs available to the PCC in step 915, the PCC continues to utilize the current preferred PCE in step 920, and the sequence ends in step 940. In the event that there are alternate PCEs available in step 915, the PCC may be configured to determine whether the alternate PCEs have less congestion in step 925, such as by received congestion notifications, etc., as described above. If there are no alternate PCEs with less congestion than the preferred PCE, the PCC continues to utilize the preferred PCE in step 920. If there is at least one alternate PCE available, however, the PCC, if necessary (e.g., for pending requests), may send message to the preferred PCE to clear the pending request in step 930. At step 935, the PCC redirects the request(s) (pending and/or future) to the alternate PCE at step 935, and the sequence ends at step 940.

Advantageously, the novel technique efficiently selects an appropriate PCE to compute a path, such as a TE-LSP path, between nodes of a network to thereby reduce a set-up time for the TE-LSP and allows for faster convergence. TE-LSP set-up times are generally critical to TE sensitive applications and, thus, reduction of those times is desirable. By selecting an appropriate PCE, or, in the case of multiple PCEs, efficiently load balancing a set of requests among the PCEs, PCE overload is obviated, thus reducing the TE-LSP set-up time since the path computation time is thereby reduced.

While there has been shown and described an illustrative embodiment that efficiently selects a PCE to compute a path between nodes of a computer network, it is to be understood that various other adaptations and modifications may be made within the spirit and scope of the present invention. Notably, the invention has been shown and described herein using IGP messages and extensions to IGP to transmit the PRT information of a PCE and notifications of congestion. However, the invention in its broader sense is not so limited, and may, in fact, be used with other means for flooding the notifications to PCCs. For instance, a specific PCE-PCC communication protocol may be advantageously used in accordance with the present invention. Moreover, the invention has also been shown and described herein using RSVP messages and extensions to RSVP to transmit the MRTs, PRTs, etc., as well as indications of an inability to comply with an MRT. However, the invention in its broader sense is not so limited, and may, in fact, be used with other means for transmitting this information between PCEs and PCCs. For instance, a specific PCE-PCC communication protocol may be advantageously used in accordance with the present invention.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for efficiently selecting a path computation element (PCE) to compute a path between nodes of a computer network, the method comprising:
    receiving, by a path computation client (PCC), a notification of a predictive response time (PRT) of one or more PCEs to a path computation request;
    selecting a PCE to service the path computation request and compute the path between nodes of the computer network, based on the PRT of the PCE; and
    receiving, by the PCC, a computed path between nodes of the computer network from the selected PCE.

2. The method as in claim 1, further comprising:
    calculating, at a PCE, the PRT of the PCE; and
    notifying one or more PCCs of the PRT.

3. The method as in claim 2, further comprising:
    configuring, at the PCE, a maximum PRT value (PRT_max);
    determining that the PCE is congested when the PRT is greater than or equal to the PRT_max; and
    notifying the one or more PCCs of the congested state of the PCE.

4. The method as in claim 3, further comprising:
    configuring, at the PCE, a minimum PRT value (PRT_min) for congested states;
    determining that the PCE is no longer congested when the PRT is less than or equal to the PRT_min; and
    notifying the one or more PCCs of the non-congested state of the PCE.

5. The method as in claim 3, further comprising:
    notifying the one or more PCCs, from the PCE, of a time for which the one or more PCCs must wait prior to sending path computation requests to the PCE.

6. The method as in claim 3, further comprising:
    selecting, by the PCC, an alternate PCE to which future path computation requests are sent in the event the congested PCE is the current selected PCE for the PCC.

7. The method as in claim 3, further comprising:
    notifying the one or more PCCs of the congested state of the PCE only in the event at least one alternate PCE is available.

8. The method as in claim 1, further comprising:
    distributing path computation requests from the PCC proportionally to the one or more PCEs based on the PRTs of the one or more PCEs.

9. A method for efficiently selecting a path computation element (PCE) to compute a path between nodes of a computer network, the method comprising:
    receiving a path computation request from a path computation client (PCC) at a PCE, the path computation request carrying a maximum response time (MRT);
    determining a predictive response time (PRT) of the PCE in response to the path computation request;
    in the event the PRT is greater than the MRT, sending a reply from the PCE to the PCC indicating an inability to comply with the MRT; and
    in the event the PRT is less than or equal to the MRT, processing the path computation request at the PCE and returning a computed path to the PCC.

10. The method as in claim 9, further comprising:
    receiving a request to clear the path computation request at the PCE, the request to clear the path computation request being in response to a reply indicating the inability to comply.

11. The method as in claim 10, further comprising:
    redirecting the path computation request to an alternate PCE.

12. The method as in claim 9, further comprising:
    assigning values to the MRT according to types of path computation requests.

13. The method as in claim 12, further comprising:
    assigning shorter MRTs to types with a higher priority.

14. The method as in claim 12, wherein the types are selected from the group consisting of: initial establishment requests; reroute requests, and re-optimization requests.

15. The method as in claim 9, further comprising:
    sending a reply from the PCE to the PCC indicating an inability to comply with the MRT only in the event at least one alternate PCE is available.

16. A system for efficiently selecting a path computation element (PCE) to compute a path between nodes of a computer network, the system comprising:
    one or more PCEs, the one or more PCEs configured to determine a predictive response time (PRT) to service a path computation request and compute the path between nodes of the computer network, and to send a notification including the PRT; and one or more path computation clients (PCCs), the one or more PCCs configured to receive the notification including the PRT from the one or more PCEs, and to select a PCE based on the PRT of the PCE, and to receive a computed path between nodes of the computer network from the selected PCE.

17. A system for efficiently selecting a path computation element (PCE) to compute a path between nodes of a computer network, the system comprising:

a PCE configured to receive path computation requests, and to determine a predictive response time (PRT) of the PCE in response to the path computation requests;

a path computation client (PCC) configured to send a path computation request to a PCE, the path computation request carrying a maximum response time (MRT); and wherein in the event the PRT is greater than the MRT, the PCE is further configured to send a reply from the PCE to the PCC indicating an inability to comply with the MRT, and in the event the PRT is less than or equal to the MRT, the PCE is further configured to process the path computation request at the PCE and return a computed path to the PCC.

18. A path computation client (PCC) for efficiently selecting a path computation element (PCE) to compute a path between nodes of a computer network, the PCC comprising:

a network interface configured to receive a predictive response time (PRT) of one or more PCEs to a path computation request from one or more PCCs; and a processor configured to select a preferred PCE based on the PRT of the PCE, the selected PCE to service the path computation request and compute the path between nodes of the computer network, wherein the network interface is further configured to receive a computed path between nodes of the computer network from the selected PCE.

19. A path computation element (PCE) to compute a path between nodes of a computer network, the PCE comprising:

a network interface configured to receive a path computation request from a path computation client (PCC);

a processor configured to calculate a predictive response time (PRT) for the path computation request; and wherein the processor is further configured to, i) notify one or more PCCs of the PRT, ii) in the event the PRT for the path computation request is greater than a maximum response time (MRT) contained within the path computation request, send a reply to the PCC in response to its path computation request indicating an inability to comply with the MRT, and in the event the PRT for the path computation request is less than or equal to the MRT contained within the path computation request, send a reply to the PCC that includes a computed path.

20. The PCC as in claim 18, wherein the processor is further configured to distribute subsequent path computation requests proportionally among the one or more PCEs based on the PRTs of the one or more PCEs.

21. The PCE as in claim 19, wherein the processor is further configured to, in the event the PRT for the path computation request is greater than the MRT contained within the path computation request, redirect the path computation request to an alternate PCE.

* * * * *